June 23, 1942.  F. J. BINDA  2,287,546
PROCESS OF MANUFACTURING GLASS-COATED PLASTIC MATERIAL
Filed Feb. 24, 1938
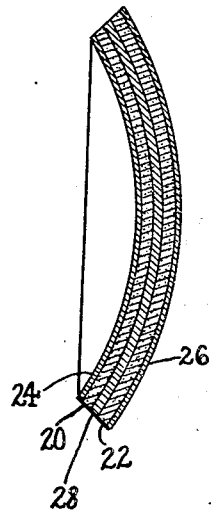
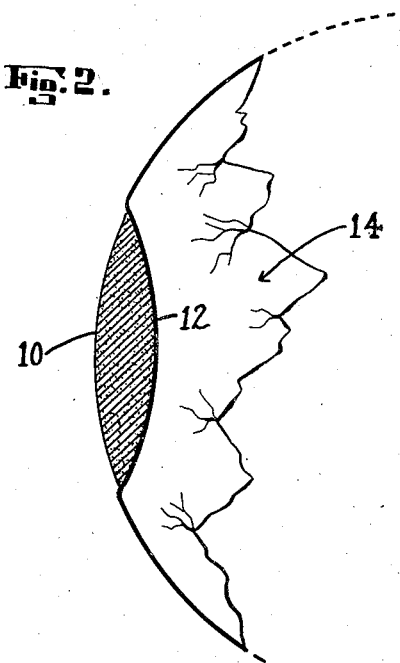
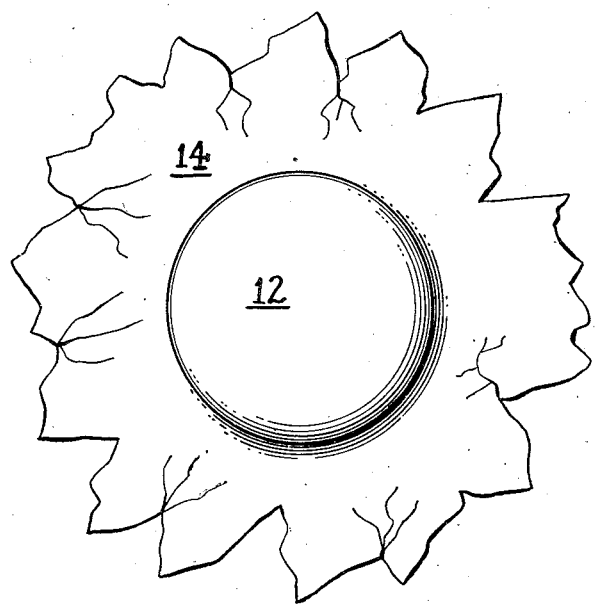
INVENTOR
Frederick J. Binda
BY
Brown & Jones
ATTORNEYS Patented June 23, 1942

2,287,546

UNITED STATES PATENT OFFICE 2,287,546

PROCESS OF MANUFACTURING GLASS-COATED PLASTIC MATERIAL

Frederick J. Binda, Boston, Mass., assignor, by mesne assignments, to Polaroid Corporation, Dover, Del., a corporation of Delaware Application February 24, 1938, Serial No. 192,234

5 Claims. (Cl. 18—59)

This invention relates to a new and improved process of manufacturing glass-coated material.

An object of the invention is to produce a plastic product, and more particularly a plastic lens or the like having adhering to at least one surface thereof a thin film of glass.

A still further object of the invention is to produce a glass-coated plastic wherein the glass coating is exceedingly thin, imparting substantially no strength to the structure of the product.

Still further objects of the invention are to provide a method of coating plastic products, and more particularly plastic lenses, with a thin film of glass; to provide such a method wherein heated glass is blown into a thin film which is caused to come in contact while heated with the surface of a plastic product; to provide such a method wherein both surfaces of a molded plastic lens may be covered with a thin film or skin of glass; and to provide such a method wherein the glass adheres to the plastic with or without the use of additional adhesive.

Other objects of the invention will in part be obvious and will in part appear hereinafter.

The invention accordingly comprises the several steps and the relation of one or more of such steps with respect to each of the others thereof which will be exemplified in the following detailed disclosure, and the scope of the application of which will be indicated in the claims.

For a fuller understanding of the nature and objects of the invention, reference should be had to the following detailed description, taken in connection with the accompanying drawing, in which:

Figure 1 is a view in section of an article produced by one form of the invention;

Fig. 2 is an end elevation of a somewhat diagrammatic representation of one step in the process of the invention; and Fig. 3 is a front elevation of the steps shown in Fig. 2.

This invention contemplates what is in effect the application of a film of glass to a molded or otherwise pre-formed plastic article. The applied film may be exceedingly thin. It may have the thickness, for example, of from a few ten-thousandths of an inch to one- or two-thousandths, as desired. Glass of such thickness is fragile at room temperature. The glass film is preferably applied to the pre-formed plastic article by forming the film adjacent the article, so that as the film forms it conforms to the configuration of the article surface. This may be accomplished by forming a thin glass film, as by blowing glass in the form of a bubble, against the article to be coated. The wall of the bubble is deformed by contact with the plastic and takes the shape of the plastic. Upon cooling, such of the glass as has come into contact with the surface of the plastic while the glass is hot or warm remains affixed thereto, and it is easy to break away the remaining glass film. One step of the process is illustrated in Figs. 2 and 3, which show a plastic lens 10, to one surface of which there has been applied a glass film 12 in the manner previously described. As shown in these figures, the film comprises a portion which adheres to and conforms to the surface of the plastic lens, and a further portion which comprises an irregularly broken portion integral with the part which has adhered to the face of the lens. This further portion, shown as at 14, may be readily removed.

In Fig. 1 there is shown a finished product comprising a lens made up of two plastic portions 20, 22, and two glass films 24, 26, one adhering to each face of the lens. Between the plastic portions there is shown a layer 28 which may be a layer of light-polarizing particles, for example a sheet of the material sold commercially under the trade name "Polaroid." It has been found easy to laminate a sheet of Polaroid between two sheets of plastic, such for example as a non-vitreous, transparent, plastic material, for example cellulose acetate. The lamination may then be shaped or molded to form a lens of suitable curvature. Such a lens is cheap, optically perfect, and efficient. It forms an admirable element for use in connection with sunglasses, for example, which employ polarizing lenses to block reflected glare.

This type of plastic lens and all other types of plastic lenses now available possess the disadvantage that they do not have a surface as hard as glass and hence, in the usual usage, they become rapidly scratched or otherwise defaced. It is highly desirable that these lenses be provided with a hard, transparent coating. It has been found somewhat difficult to laminate satisfactorily plastic sheets or films between covering lenses which have been previously ground to prescription. Good lens effects are obtained, however, only where the lenses are ground after the lamination is made, for if the lenses are pre-formed to prescription, slight alterations in the thickness of the laminating cement or polarizing film employed will alter the optical properties of the lenses and destroy their usefulness, but the temperatures and shear developed in grinding after lamination have been found destructive of the usual laminating cements.

The process of the present invention cures these defects by providing a pre-formed molded plastic lens having the desired optical properties, and by then coating the plastic with glass under such conditions that a thin glass film remains adhering to each face of the lens. This film serves as a protection and renders the surface hard and durable. Plastics may be employed having approximately the refractive index of the glass used or, if this is found inadvisable, allowance may be made for the difference in refractive indices in the construction of the lens. In most cases this difference may be neglected.

It will be apparent that the process of the present invention may be employed in connection with articles other than lenses. Pre-formed plastics may be coated with glass for many uses, provided only that the surface which is being coated is of a type adapted to receive the glass film readily. It will also be apparent that plastic lenses need not comprise light-polarizing material. A glass-coated plastic lens may be formed from the present invention which may be adapted for use wherever lenses may be employed.

The plastic, in every case, may, if desired, be coated with an adhesive and, under these conditions, a somewhat better bond may at times be obtained.

In the specification and claims the word "corticated" will be understood as meaning "covered with a thin film or skin."

Since certain changes in carrying out the above process may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. A method of coating with glass a lens formed of cellulose acetate comprising bringing a thin heated film of glass into contact with said lens, the film being of such a temperature as to conform readily to the surface of the lens with which it is brought in contact, said film being of such exceeding thinness as to harden in contact with the said surface of said lens without destroying the optical properties thereof, and pressing said film against said lens with substantially no more pressure than necessary to establish said contact and to cause said film to adhere to said cellulose acetate.

2. A method of coating with glass a lens formed of a transparent, organic plastic comprising bringing a thin heated film of glass into contact with said lens, the film being of such a temperature as to conform readily to the surface of the lens with which it is brought in contact, said film being of such exceeding thinness as to harden in contact with the said surface of said lens without substantially altering the optical properties thereof, and pressing said film against said lens with substantially no more pressure than necessary to establish said contact and to cause said film to adhere to said plastic.

3. A method of coating with glass a lens formed of cellulose acetate and having a plurality of curved surfaces comprising bringing a thin heated film of glass into contact with said lens, the film being of such a temperature as to conform readily to the surface of the lens with which it is brought in contact, said film having a thickness not exceeding 0.001 inch, and pressing said film against said lens with substantially no more pressure than necessary to establish said contact and to cause said film to adhere to said cellulose acetate, and coating all curved surfaces of said lens similarly with a glass film.

4. A method of the character described comprising forming a lamination between two sheets of cellulose acetate of a light-polarizing material, shaping said lamination to impart a predetermined curvature thereto, and applying to each of the curved surfaces of said lamination a thin film of heated glass, said glass being of such thickness and at such temperature as to conform readily to the curved surface of said lamination with which it is brought in contact, and pressing said heated glass against said lamination with only so much pressure as to cause said glass to conform to the surface of said lamination and to adhere thereto.

5. A method of coating with glass a lens formed of a transparent, organic plastic and having a plurality of curved surfaces comprising bringing a thin heated film of glass into contact with said lens, the film being of such a temperature as to conform readily to the surface of the lens with which it is brought in contact, said film being of such exceeding thinness as to harden in contact with the said surface of said lens without substantially altering the optical properties thereof, and pressing said film against said lens with substantially no more pressure than necessary to establish said contact and to cause said film to adhere to said plastic, and coating all curved surfaces of said lens similarly with a glass film.

FREDERICK J. BINDA.